United States Patent [19]
Mulrow et al.

[11] Patent Number: 5,454,025
[45] Date of Patent: Sep. 26, 1995

[54] SWITCH BYPASS FOR A PUBLIC SAFETY CALLING SYSTEM

[76] Inventors: Robert J. Mulrow, 1570 Jasper Dr., Wheaton, Ill. 60187; Donald J. Jester, 2633 Sun Valley Dr., Lisle, Ill. 60532

[21] Appl. No.: 975,243

[22] Filed: Nov. 12, 1992

[51] Int. Cl.$^6$ .................................................. H04M 11/04
[52] U.S. Cl. ........................... 379/45; 379/48; 379/221; 379/279
[58] Field of Search .................. 379/45, 46, 49, 379/10, 14, 16, 221, 265, 266, 272, 273, 279, 263

[56] References Cited

U.S. PATENT DOCUMENTS

| | | | |
|---|---|---|---|
| 3,909,545 | 9/1975 | Fuchs | 379/45 |
| 3,978,291 | 8/1976 | Bergeron et al. | 379/16 |
| 4,119,815 | 10/1978 | Frankfort et al. | 379/221 |
| 4,286,118 | 8/1981 | Mehaffey et al. | 379/263 |
| 4,400,587 | 8/1983 | Taylor et al. | 379/266 |
| 4,455,645 | 6/1984 | Mijioka et al. | 379/279 |
| 4,731,825 | 3/1988 | Wojcinski et al. | 379/16 |
| 4,774,703 | 9/1988 | Force et al. | 379/16 |
| 4,807,280 | 2/1989 | Posner et al. | 379/272 |
| 4,907,253 | 3/1990 | Watrous | 379/272 |
| 4,943,999 | 7/1990 | Ardon | 379/279 |
| 4,972,465 | 11/1990 | Cline et al. | 379/279 |
| 5,058,105 | 10/1991 | Mansour et al. | 379/221 |
| 5,187,706 | 2/1993 | Frankel et al. | 379/279 |
| 5,259,027 | 11/1993 | Winter et al. | 379/279 |

*Primary Examiner*—Wing F. Chan

[57] ABSTRACT

A switch bypass (10) for a Public Safety Calling System (12) having a first switch A for routing telephone calls, a second switch B for routing telephone calls, and a device 14a and 14b for bypassing the first switch A responsive to a failure in the first switch, and for transferring the call to the second switch B.

10 Claims, 3 Drawing Sheets

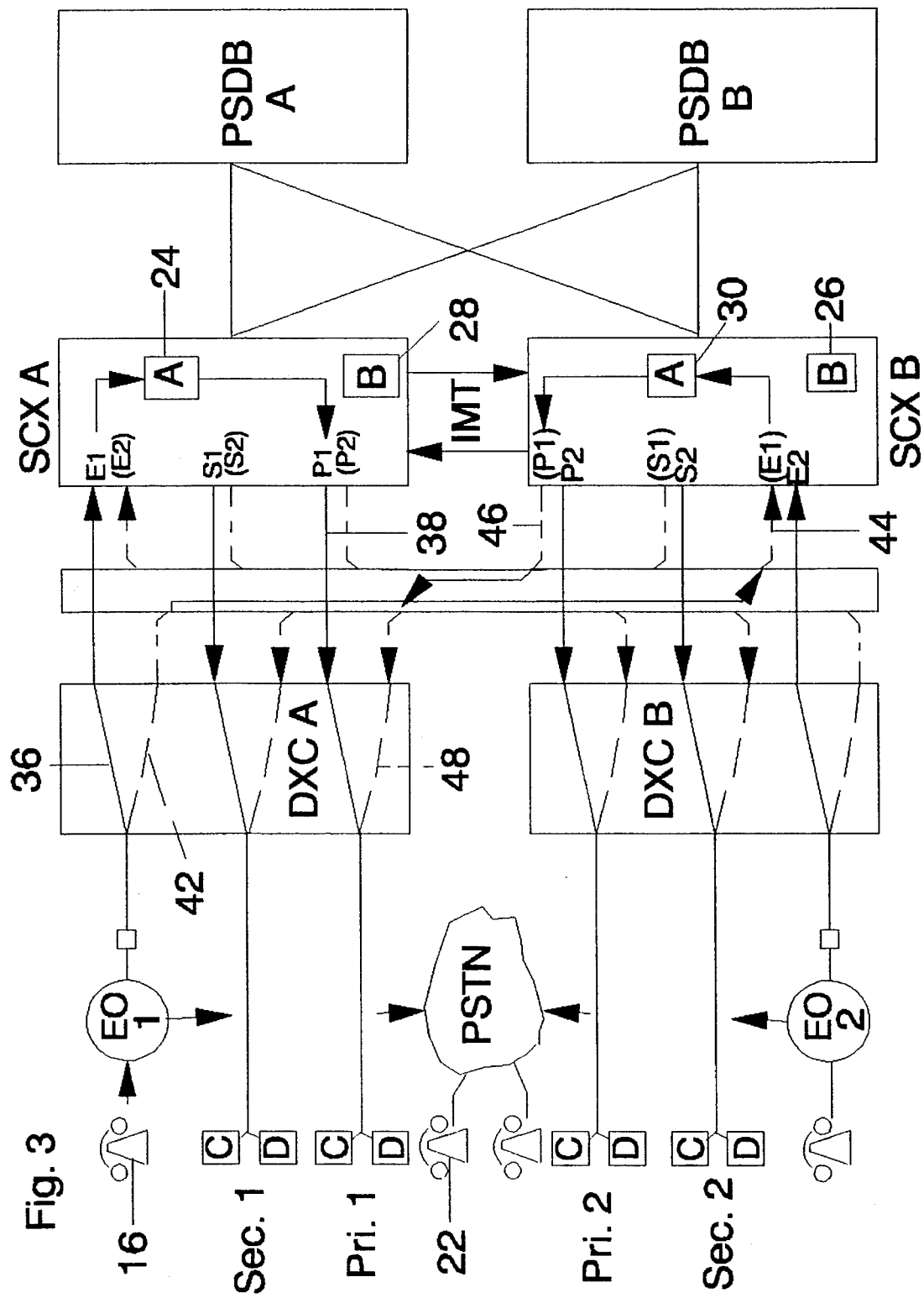

SWITCH BYPASS FOR A PUBLIC SAFETY CALLING SYSTEM

BACKGROUND OF THE INVENTION

The present invention relates to switch bypasses for a Public Safety Calling System (PSCS).

In the past, switches, such as a Specialized Communication Exchange (SCX) switches, have been used for routing calls in a telephone system. More recently, a 911 emergency service has been added to such telephone systems, termed a Public Safety Calling System (PSCS). The 911 telephone switches serve to route emergency calls to such locations as a police office or fire station for prompt action.

It has been found, however, that occasionally an SCX of such an emergency 911 telephone system may fail, thus posing the possibility that such emergence calls may not be routed until the SCX has been restored to proper operating condition, which might result in a disaster. It is thus apparent that it would be desirable to still route such emergency 911 calls in the event of a switch failure.

SUMMARY OF THE INVENTION

A principle feature of the present invention is the provision of a switch bypass for a Public Safety Calling System (PSCS).

The switch bypass of the present invention comprises, first switch means for routing telephone calls, and second switch means for routing telephone calls.

A feature of the invention is that the switch bypass bypasses the first switch means responsive to a failure in the first switch means.

Yet another feature of the invention is that the switch bypass transfers the calls placed to the first switch means on the second switch means for handling.

Another feature of the invention is that the second switch means properly routes the calls originally placed to the defective first switch means.

Still another feature of the invention is that the first switch means is bypassed through use of at least one cross connect in the first switch means.

Yet another feature of the invention is that the second switch means transfers calls originally placed to the first switch means back to a cross connect of the first switch means for handling.

Another feature of the invention is that the first switch means again properly routes the calls responsive to renewed proper operation of the first switch means.

Thus, a feature of the invention is that the switch bypass minimizes the possibility that an emergency call will not be routed by the defective first switch means.

Another feature of the invention is that the switch bypass provides improved switching capabilities in a more efficient manner.

Yet another feature of the invention is that the second switch means may be bypassed in the event of failure of the second switch means, and the calls originally placed to the defective second switch means may be transferred to the first switch means for handling.

Thus, a feature of the invention is that both the first and second switch means provide a backup capability of the switch means to prevent loss of emergency telephone calls.

Further features will become more full apparent in the following description of the embodiments of this invention, and from the appended claims.

DESCRIPTION OF THE DRAWINGS

In the drawings:

FIG. 3 is a block diagram of the switch bypass showing different configurations of switches in the switch bypass.

DESCRIPTION OF THE PREFERRED EMBODIMENTS

Figure 1:
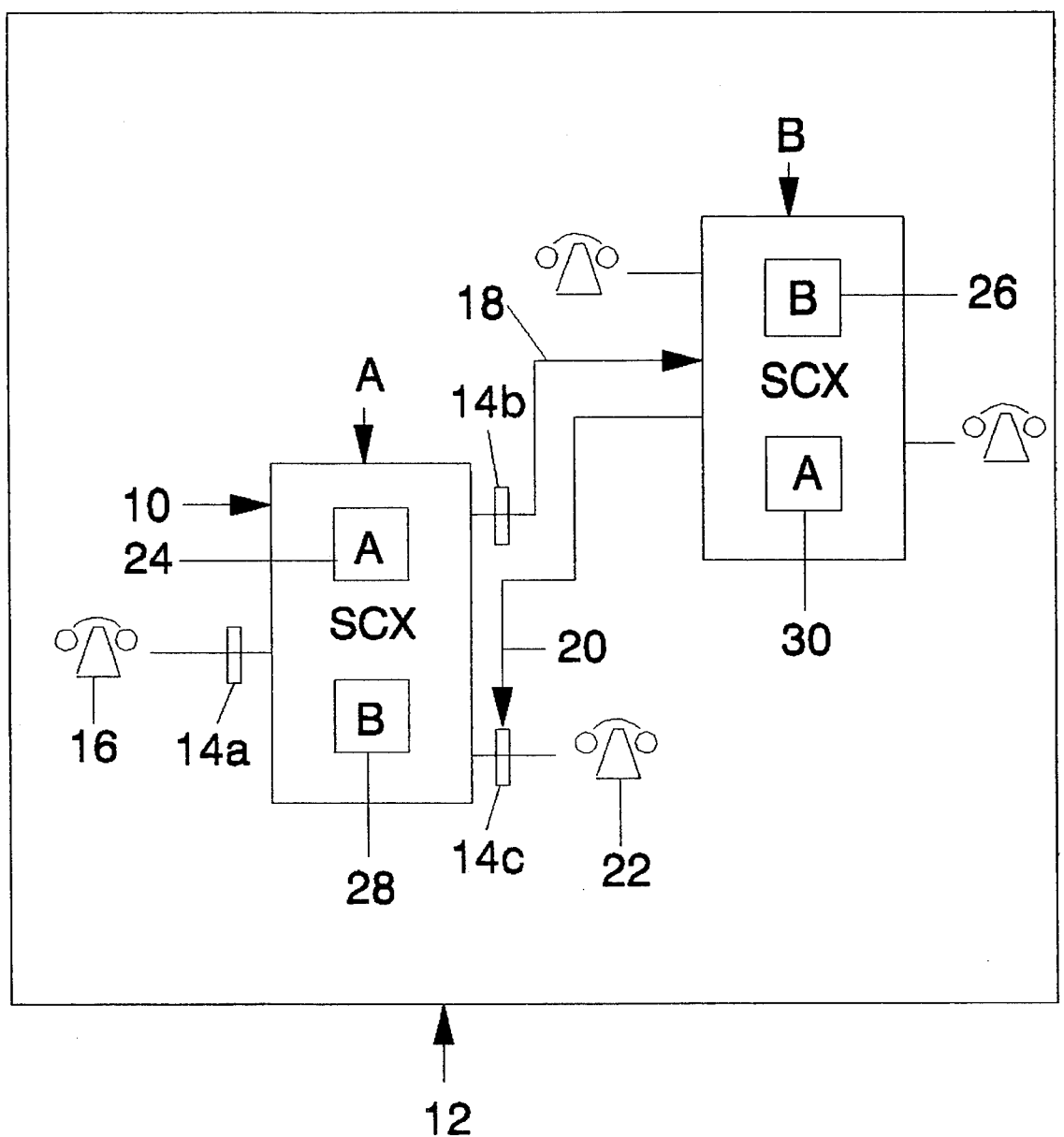
FIG. 1 is a block diagram of a switch bypass of the present invention under a condition with a fault in a first switch.

Referring now to FIG. 1, there is shown a switch bypass generally designated 10 for a Public Safety Calling System (PSCS) 12 for routing of emergency 911 telephone calls. As shown, the switch bypass 10 has a first switch A for routing a first set of telephone calls, such as a Specialized Communication Exchange (SCX) switch. The PSCS 12 also has a second switch B for routing a second set of telephone calls, such as a second Specialized Communication Exchange (SCX) switch. In usual operation, both the SCX A and SCX B each route different sets of 911 telephone calls dependent upon various relative factors, such as determined by the location of the two switches SCX A and SCX B.

As shown, the SCX A has a plurality of cross connects 14a, 14b, and 14c for a purpose which will be discussed below. The SCX A also has a routing table A 24 for the purpose of routing calls originally placed to the first SCX A, and a back up routing table B 28 for routing telephone calls originally placed to the SCX B. The second SCX B also has a routing table B 26 for routing calls originally placed to the second switch SCX A, and a second back up routing table A 30 for routing calls originally placed to the first switch SCX A.

In the event of a fault in the first SCX A, as determined by the user, a command is issued to the SCX A indicating the failure in the switch. Also, the user issues a command to a digital cross connect DXC A associated with the switch A. The DXC A usually routes calls on a first branch as indicted by solid lines, and has a switch actuated by the command to route calls on a second different branch by the DXC A, as indicated by the dotted lines in the drawing. In turn, the cross connects 14a and 14b route the incoming call placed from a telephone 16 on a line 18 to the second SCX B which is in a proper operating condition. The SCX B reroutes this call to the cross connect 14c of the first SCX A on a line 20 which then routes the call to the receiving telephone 22, such as a police or fire station, in order to complete the emergency call. When the first SCX A has been restored to proper operating order, as determined and indicated by the user to the SCX A, the digital cross connect DXC A is restored to its original switch configuration, and the first SCX A again will route the incoming 911 telephone calls in the usual manner.

With reference to FIG. 3, when the first switch SCX A is in proper operating order, an incoming call placed by the telephone 16 passes through a Central Office EO 1 to a digital cross connect (DXC) A which routes the call in this switch on the usual solid line 36 to a port E1 in the first SCX A. The SCX A utilizes the routing tables A in the SCX A to route the call on a port P1 and onto line 38 to the DXC A in the usual switching configuration shown by the solid line in the DXC A. In turn, the DXC A routes the call to the primary receiving telephone 22, such as a police station to monitor the emergency 911 call.

In the event of a failure in the first SCX A, a command is issued by the user to the DXC A in order to actuate this switch to route calls on alternates lines which are shown as dotted lines in the drawing. Thus, an incoming call from the telephone 16 is routed by the DXC A 34 on the alternate line 42 and over a line 44 to a port E1 of the second SCX B. When the failure in the first SCX A has been detected, a command is also issued by the user to the second SCX B to alert this switch that calls originally placed to the first SCX A will be received on the port E1. Thus, the command enables the port E1 in the second SCX B which is otherwise rarely used.

The second SCX B then utilizes the routing tables A in the switch SCX B to route the calls onto an alternate port P1 and onto a line 46 to an alternate line 48 of the first DXC A. The DXC A switches the line 48 to the primary receiver comprising the telephone 22 at the police station in order to complete the call. In this manner, the digital cross connects and switches SCX A and SCX B cooperate in order to continuously route telephone calls even when the first switch SCX A has failed.

Thus, in a accordance with the present invention, the switch bypass 10 overflows emergency telephone calls from the first inoperative SCX A to the second SCX B for handling in order to prevent the loss of the emergency calls. The second SCX B returns the calls originally placed to the SCX A for completion of the calls.

Figure 2:
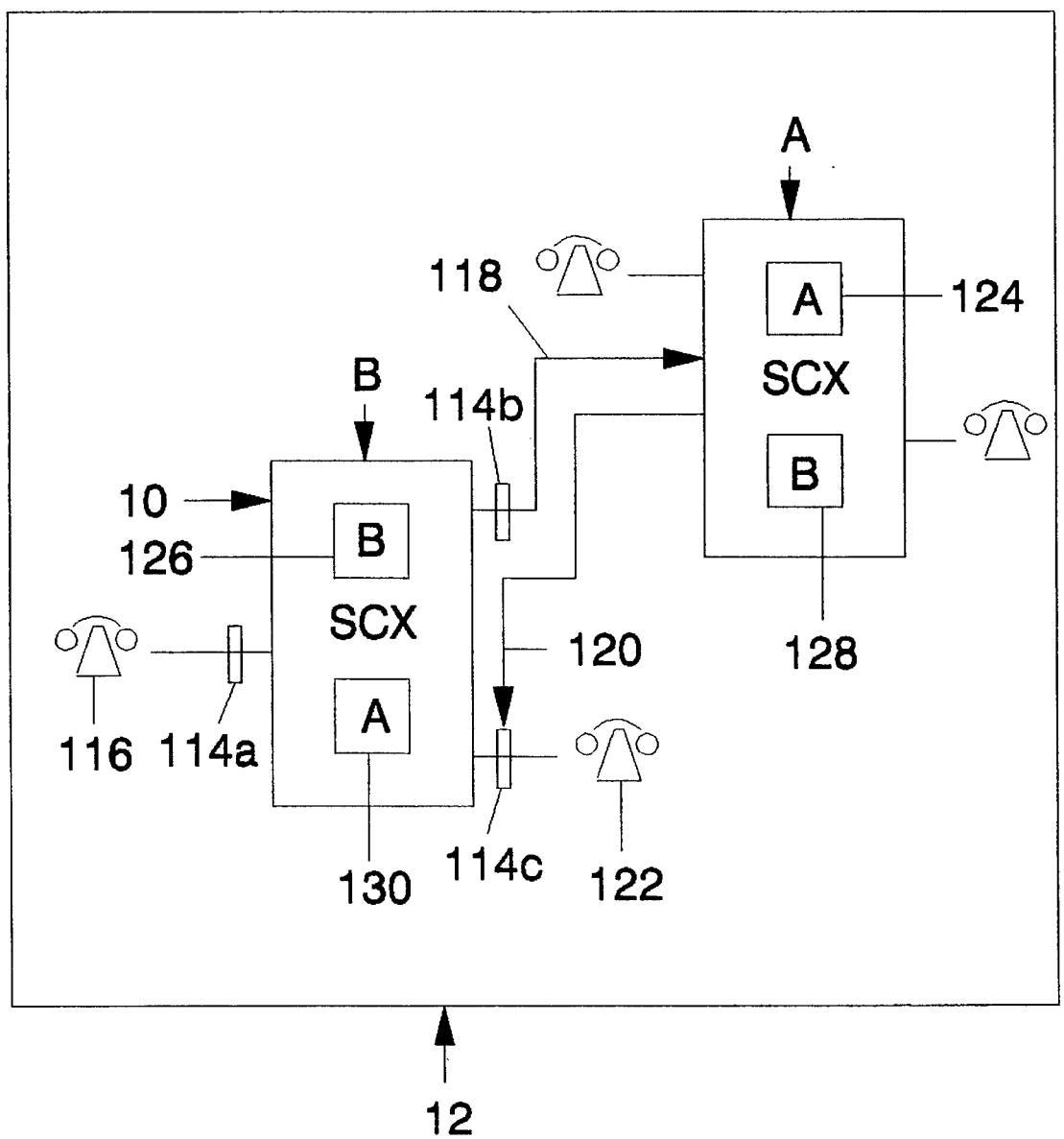
FIG. 2 is a block diagram of the switch bypass of FIG. 1 under a condition with a fault in second a second switch.

With reference to FIG. 2, the second SCX B may also have a plurality of cross connects 114a, 114b, and 114c, and the routing tables A and B. In the event of a failure of the second SCX B while the first SCX A is in proper operating order, the calls are transferred by the cross connects 114a and 114b on a line 118 to the first SCX A, after which the first SCX A routes the calls back to the second SCX B on the line 120 in order to route the calls placed by a telephone 116 to the receiving telephone 122, such as the police or fire station associated with the second SCX B. In this manner, the first SCX A also serves as a backup for the second SCX B when the second SCX B is not in proper operating order in order to insure the completion of emergency calls originally placed to the second SCX B.

The foregoing detailed description has been given for purpose of understanding only, and no unnecessary limitations should be understood therefrom, as modifications will be obvious to those skilled in the art.

What is claimed is:

1. A switch bypass for a Public Safety Calling System, comprising:
    first switch means for routing telephone calls and having a plurality of cross connects for bypassing the first switch means responsive to a failure in the first switch means; and
    second switch means for routing telephone calls and receiving the call from the first switch means, and for routing the call back to a cross connect of the first switch means.

2. A switch bypass for a Public Safety Calling System, comprising:
    first switch means for routing telephone calls;
    a digital cross connect associated with the first switch means;
    second switch means for routing telephone calls;
    means for bypassing the first switch means responsive to a failure in the first switch means, and for transferring the call to the second switch means; and
    means for routing the call from the second switch means through the digital cross connect associated with the first switch means during failure of the first switch means to the desired receiving party.

3. The switch bypass of claim 2 wherein the transferring means includes a cross connect in the first switch means.

4. The switch bypass of claim 2 wherein the bypassing means includes at least one cross connect in the first switch means.

5. A switch bypass for a Public Safety Calling System, comprising:
    first switch means for routing telephone calls and having means for bypassing the first switch means responsive to a fault in the first switch means;
    a digital cross connect associated with the first switch means; and
    second switch means for routing telephone calls and having means for receiving the call from the first switch means and for routing the call back to the digital cross connect of the first switch means during a failure of the first switch means.

6. The switch bypass of claim 5 wherein the bypassing means includes at least one cross connect in the first switch means.

7. The switch bypass of claim 5 wherein the second switch routing means includes at least one cross connect in the first switch means.

8. A switch bypass for a Public Safety Calling System, comprising:
    first switch means for routing telephone calls;
    a digital cross connect associated with the first switch means;
    second switch means for routing telephone calls; and
    means for overflowing a call placed to the first switch means to the second switch means responsive to a failure in the first switch means, and for routing the call back to the digital cross connect of the first switch means during failure of the first switch means.

9. The switch bypass of claim 8 including means for restoring the routing of calls by the first switch means responsive to renewed operation of the first switch means.

10. The switch bypass of claim 9 wherein the second switch means includes means for bypassing a call placed to the second switch means to the first switch means responsive to a fault in the second switch means.

* * * * *